March 12, 1974   J. F. MEISSNER, SR   3,796,658
SLUDGE RECLAMATION SYSTEM AND METHOD Filed Nov. 26, 1971   4 Sheets-Sheet 1

Inventor
John F. Meissner
by Pendleton, Neuman
Williams & Anderson
Atty's

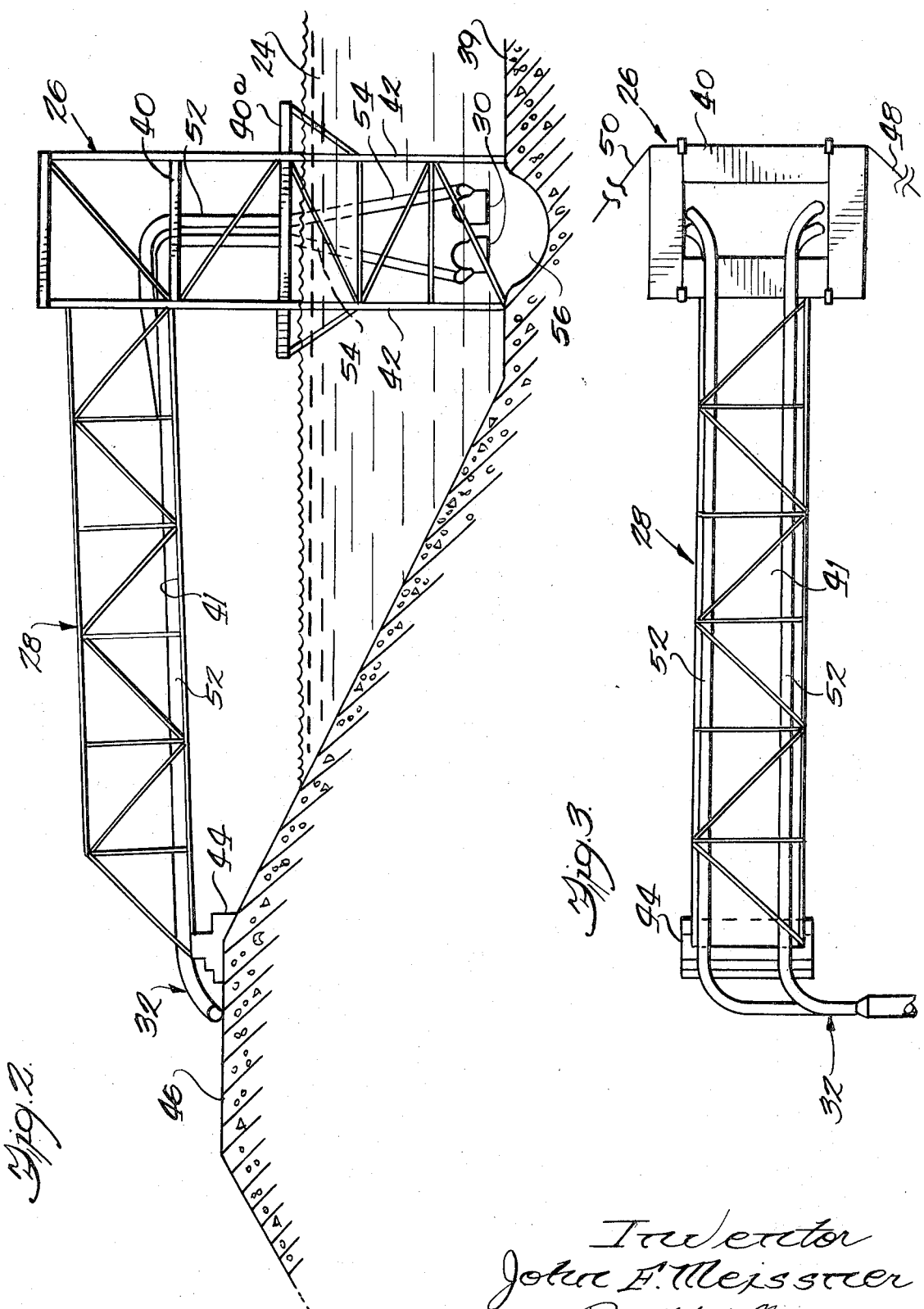

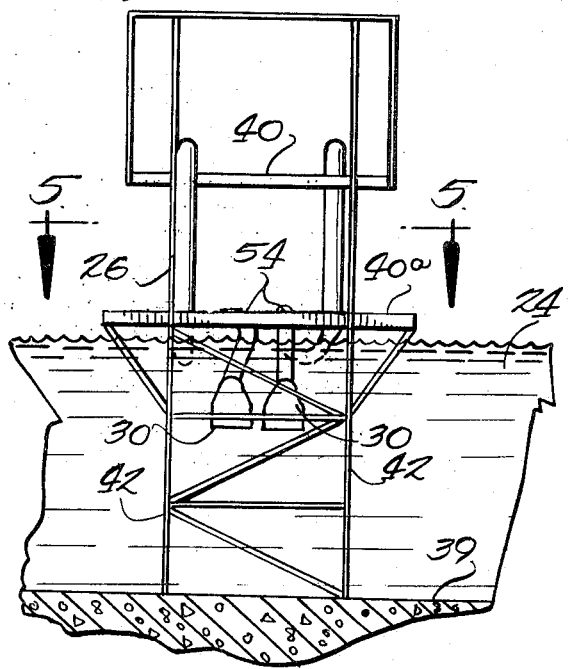
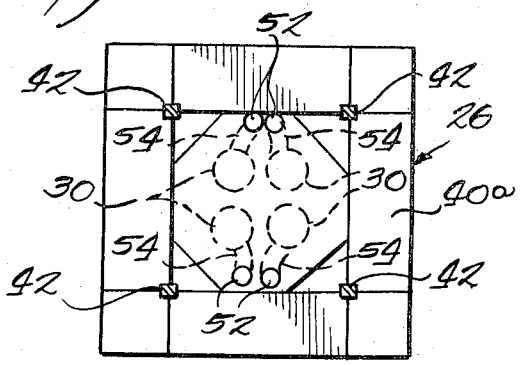
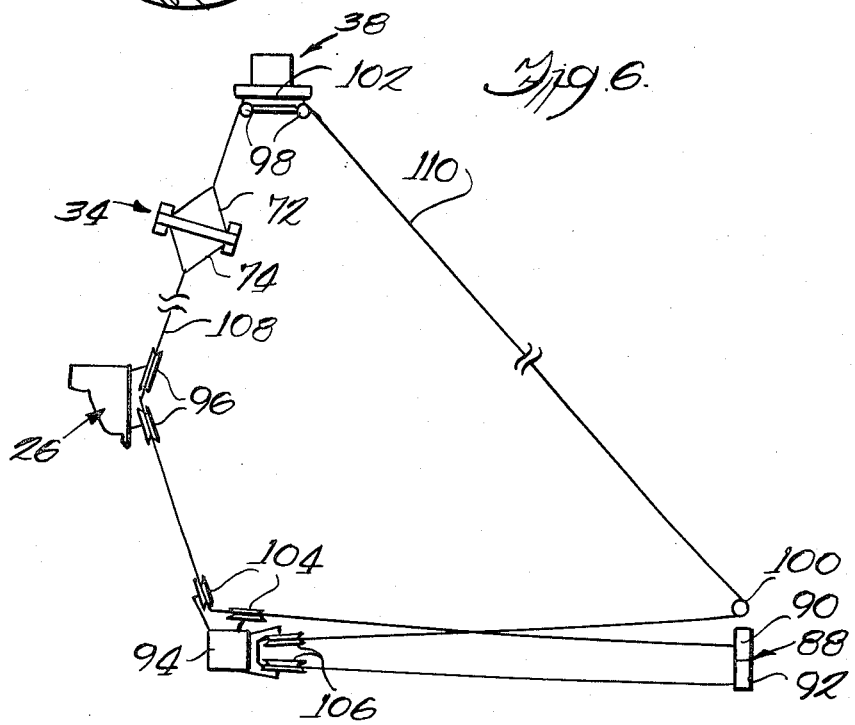

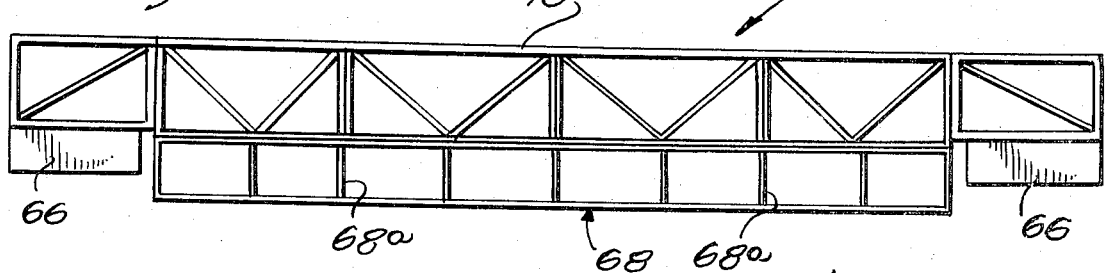
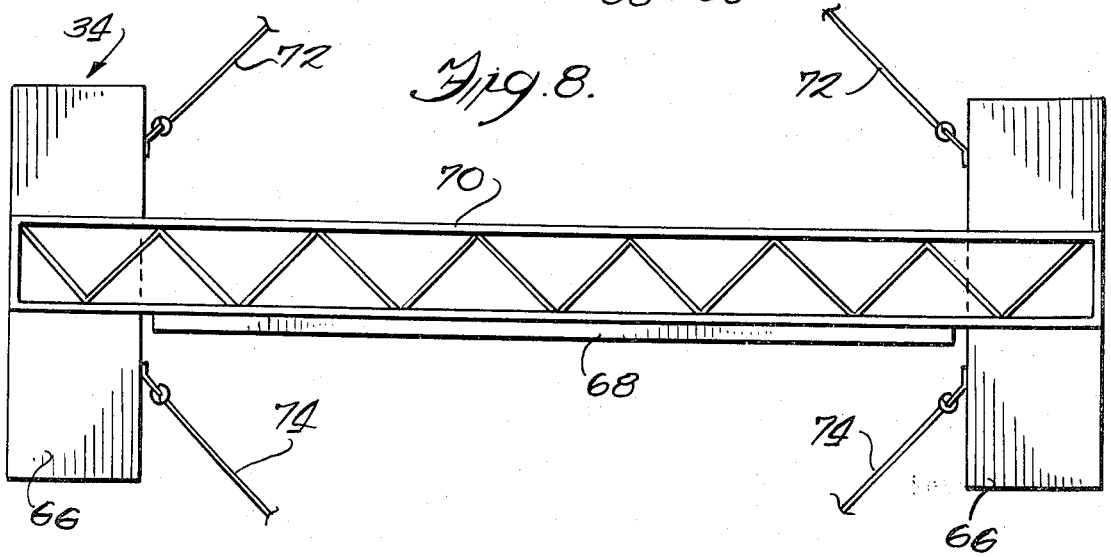
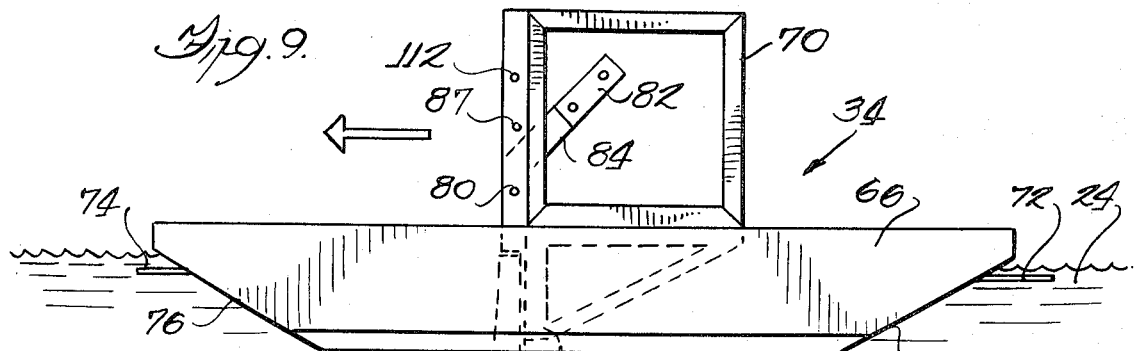
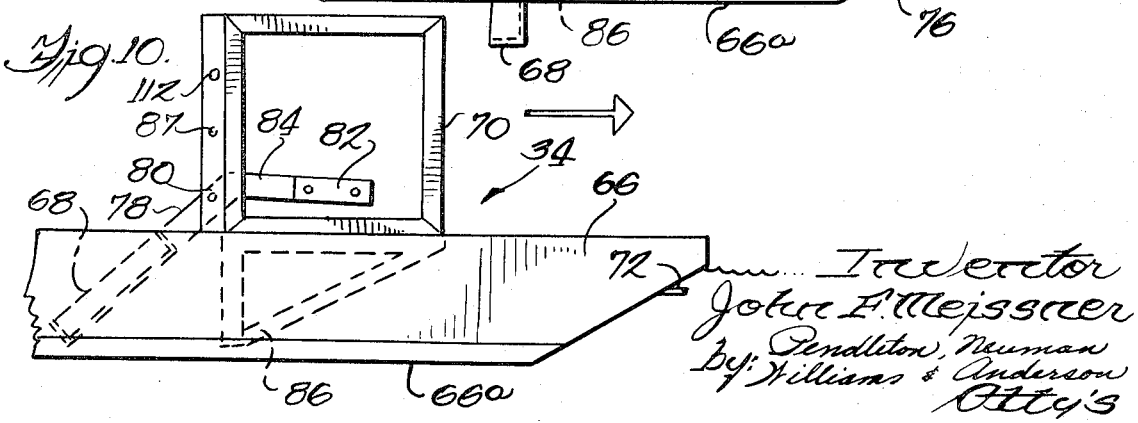

United States Patent Office 3,796,658
Patented Mar. 12, 1974

3,796,658
SLUDGE RECLAMATION SYSTEM AND METHOD
John F. Meissner, Sr., Hinsdale, Ill., assignor to Bauer Engineering Inc., Chicago, Ill.
Filed Nov. 26, 1971, Ser. No. 202,493
Int. Cl. B01d 21/18, 37/00
U.S. Cl. 210—65
25 Claims

ABSTRACT OF THE DISCLOSURE

An apparatus and method for reclaiming viscous sewage sludge from large storage lagoons comprising cable-operated floatable skimmers which move the gelatinous sludge toward submersible pumps at a fixed pumping site whereby the sludge is pumped from the lagoon for transport.

---

This invention relates to the handling of thick viscous or thixotropic materials, and more particularly to the reclamation from storage lagoons of the sludge produced as a by-product of an activated sludge sewage treatment process.

Sewage sludge as referred to herein is a by-product of an activated sludge sewage treatment process or other sewage treatment operation. Such sludge is usually accumulated and stored in large lagoons or other reservoirs which normally are adjacent a sewage treatment plant. The storage achieves a thickening of the material due to decreasing moisture content. Moisture content may range from about 97% to as low as 65%, but commonly is in the range of 92% to 85% after aging for several years in a lagoon. At these common moisture levels, the sludge does not behave as a fluid, but rather resembles a heavy viscous or soft gelatinous material having thixotropic tendencies. The need to avoid continually expanding storage problems and to find some manner of ultimate disposal of such sludge raises a concomitant requirement for reclaiming the sludge from such lagoons, such as for transporting it to some other location where it may be utilized. However, in its normal condition the stored sludge is very difficult to handle, being neither a solid nor a liquid. Removing and transporting the gelatinous sludge from these lagoons thus has posed a material handling problem.

It has been found that it is possible to pump the sludge if an appropriate pump can be kept supplied with material. However, the material will not flow unassisted to any significant extent, except over very prolonged periods of time. Therefore a pump placed in the sludge simply pumps out a small area or cavity, and ceases to receive additional input after the immediately adjacent material is removed.

The fact that the sludge often must be transported such as by rail tank car or otherwise, once it is removed from the lagoon, highlights another aspect of the material handling problem. Adding water to the sludge will reduce the aforementioned flow and pumping problem to some extent, but the increased weight and volume of the resulting material increases the shipping costs. It is most economical to transport the highest percentage of solids possible, thereby eliminating the expense of transporting unnecessary water. Since the material in the lagoons has already lost moisture and thickened with age, it is desirable to transport the material in its thickened condition or with the addition of only the minimum amount of water necessary to facilitate pumping.

It is an object of this invention to overcome the aforementioned problems in reclaiming sewage sludge from lagoons.

It is an object of this invention to provide apparatus and methods for economically removing heavy viscous materials from storage basins.

It is an object of this invention to provide for pump removal from broad shallow storage basins of viscous or thixotropic materials which will not flow satisfactorily under natural conditions.

It is an object of this invention to provide for removal of sewage sludge from storage lagoons by pumping from a fixed position and for keeping the pump supplied with sufficient sludge for proper pumping.

It is another object of this invention to provide for handling of sludge at relatively low moisture content for economical shipment.

In one embodiment of the invention, pumps remove heavy viscous material, such as gelatinous sludge, from a storage basin. A tower is held in position in the basin by an access truss and guy wires. The tower supports the pumps and related piping. A floatable skimmer utilizing pontoons for floatation and having a pivotally retractable pusher blade is drawn across the basin to bring material to the pumps. The floatable skimmer is drawn or pulled to and from the pump location by a cable system which includes a working run from the tower to a movable tail unit, thereby allowing the skimmer to traverse any portion of the lagoon area along an appropriate radial path for bringing the sludge to the pumps. During in-haul, the skimmer pushes a large indefinite mass of the material towards the pumps. As the skimmer is withdrawn during out-haul to engage another load, the blade pivots away from the direction of travel under the force of passing adjacent material thereby permitting the skimmer to be withdrawn without undue restraint or drag. A plurality of pumps and floatable skimmers may be utilized simultaneously in a single system.

The skimmer comprises a pair of floatation pontoons supporting a frame and a pivotally mounted retractable pusher blade. The blade pivot location is adjustable, enabling the blade height to be raised as the depth of material decreases to where floatation is impractical and finish scaping of the basin bottom is desired. The pontoons serve as skids during this finish scraping.

Other objects and advantages of the invention will become apparent upon considering the detailed description and upon reference to the drawings, in which:

FIG. 2 is an elevation view of the tower and access truss assembly;

FIG. 3 is a plan view of the tower and access truss showing the piping arrangement for the pumps;

FIG. 4 is an elevation view of the tower and pumps indicating the adjustability of the pumps to be operated at the appropriate level;

FIG. 5 is a cross-section taken along line 5—5 of FIG. 4 and showing the pumps relative to the tower;

FIG. 6 is a fragmentary schematic illustration of a cable and drive arrangement to operate the skimmers;

FIG. 7 is an elevation view of the floatable skimmer;

FIG. 8 is a plan view of the skimmer;

FIG. 9 is a side view of the skimmer showing the retractable blade during in-haul travel; and FIG. 10 is a fragmentary side view of the skimmer showing the blade pivoted upward during out-haul travel.

Figure 1:
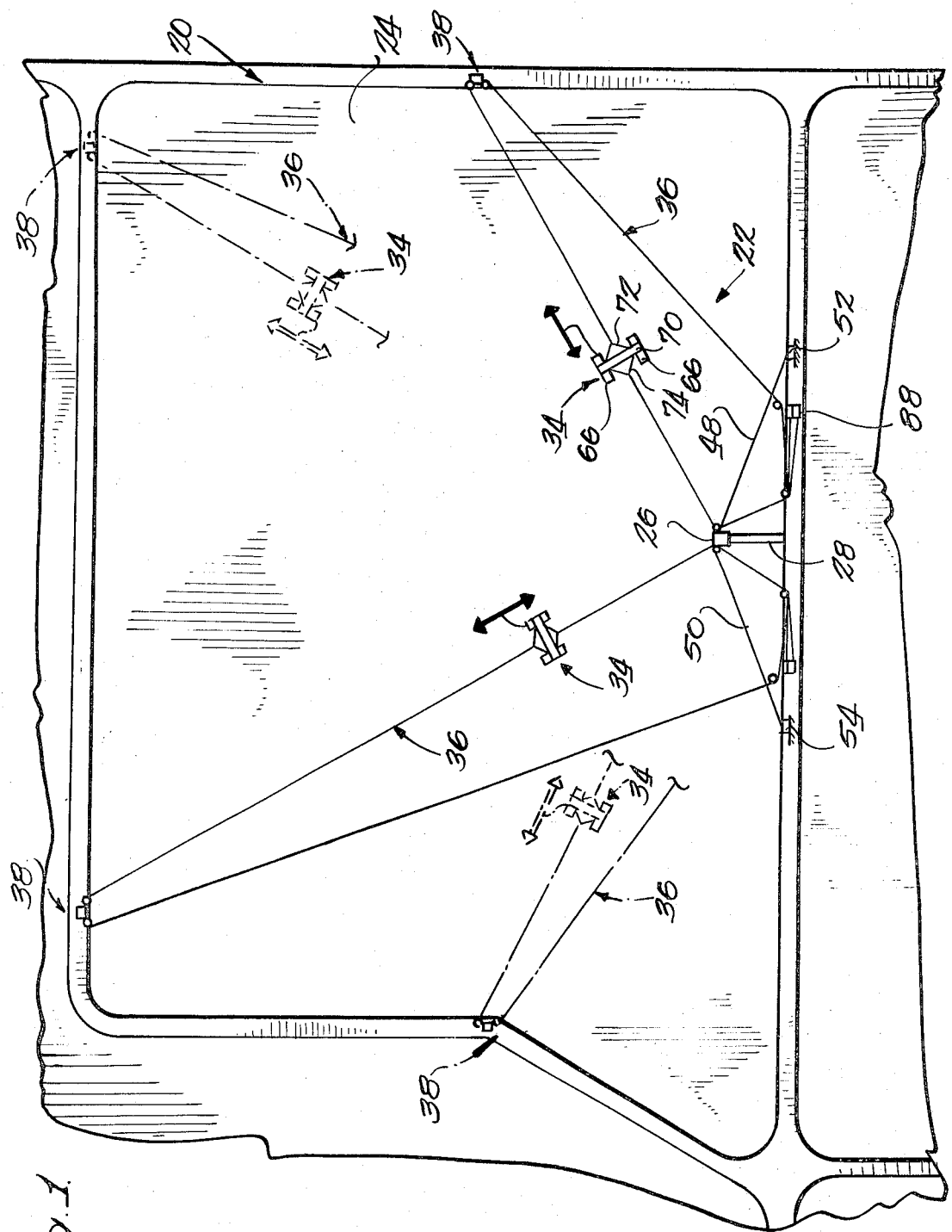
FIG. 1 is a plan view of a large storage lagoon for sewage sludge, with a sludge reclamation system employing teachings of the invention. The movable tail anchor is shown at various positions around the perimeter of the lagoon.

While the invention will be described in connection with the preferred embodiment and procedure illustrated in the drawings, it will be understood that it is not intended to limit the invention to that embodiment and procedure.

Referring first to FIG. 1, a typical sludge lagoon 20 is shown fitted with a unique material handling system 22 for reclaiming the lagoon sludge 24. The initial depth of sludge in the lagoon varies widely from lagoon to lagoon, but a typical depth is about 15 feet.

The system 22 includes a head tower 26 at the outer end of a support and access trestle 28. Intake pumps 30 (FIGS. 2 and 4) are supported on the tower 26 and are connected to a pipeline system 32 (FIGS. 2 and 3) which leads to a suitable discharge location, e.g., a disposal or transfer area such as at a railroad siding. One or more floatable skimmers 34 are connected to appropriate cable drive systems 36 extending from the head tower 26 to related tail units as at 38 along the perimeter of the lagoon remote from the tower.

The skimmers are reciprocated along various radii between the tower and the perimeter of the lagoon to bring the non-flowable viscous sludge to the pumps. System flexibility is provided for various lagoon configurations in that the tail mechanism is movable to any position around the lagoon perimeter. Thus, substantially all of the lagoon 20 can be traversed by a skimmer 34 as it travels back and forth between the tower 26 where the pumps are located and the respective tail mechanism 38. Also, it can be recognized as shown in FIG. 1, that a plurality of skimmers working concurrently can be employed to keep the pumps supplied with material.

Turning now to FIGS. 2, 3, 4 and 5, the tower 26, access truss 28, and sludge pumps 30 and connecting piping are shown in greater detail. It will be seen that the lagoon sides, commonly called dikes or berms generally slope to the lagoon bottom 39, thereby requiring that the pumps be positioned some distance from the perimeter crest in order to be lowered to the bottom 39. Tower 26 is a welded structure of steel or other suitable material, of an open truss design as shown in FIGS. 2 and 4, with an operator's platform 40 near its upper end and readily accessible from a walkway 41 provided on the truss 28. A service platform 40a also is provided on the tower for convenient access to the pumps and related equipment, as for routine inspection and maintenance. The tower rests on or is embedded in the lagoon bottom 39 and extends an appropriate distance above the level of the sludge. Access truss 28 also may be of welded steel open truss design, or other suitable material.

FIGS. 2 and 3 indicate a preferred manner of securing the tower 26 in position. The vertical legs 42 are set or driven a short distance into the earth at the bottom of the lagoon to anchor the tower base against lateral movement. The access truss 28, shown substantially horizontal in FIG. 2, is secured at one end to the upper portion of the tower 26. The other end of the truss 28 is anchored at the side of the lagoon 20, as by being secured to a concrete foundation 44 provided in the berm or dike 46. Guy wires 48 and 50 shown in FIGS. 1 and 3, are attached to opposite sides of the upper portion of the tower 26 and have their opposite ends anchored to deadmen 52-54 fixed in the berm at locations spaced well to either side of the truss 28, as is seen in FIG. 1. These guy wires stabilize the tower 26 and counteract external loads incurred by the tower 26 from the operation of the skimmers 34. The guy wires 48 and 50 are tensile members which serve as stays while the access truss 28 serves as both a tensile and a compression member depending on the angle and direction of the lateral loading applied to the tower 26 by the skimmer cable system(s) 36.

The preferred tower and supporting arrangement just described provides a stable, effective head tower for the cable systems 36, while affording support for the sludge pumps 30 and the related piping and a superstructure enabling vertical adjustment of the pumps as the sludge elevation varies, with access to the pumps 30 and the piping. This structure is substantially independent of the slope and height of the lagoon sides 46, and permits the pumps 30 to be lowered to the bottom 39 of the lagoon, and into a sump 56 (FIG. 2). Moreover, no fixed foundation is required in the sludge storage pond area of the lagoon. Thus, the tower and truss unit may be prefabricated on shore or at a remote site, then placed in position and anchored while working from the surface, i.e., without requiring caissons or other procedures for placing foundations in the sludge lagoon.

Directions of travel of the skimmers 34 are indicated by arrows drawn adjacent to the skimmers in FIG. 1. "In-haul" direction of travel occurs when a skimmer is moving towards the tower 26 and/or pumps 30 and "out-haul" direction of travel occurs as the skimmer 34 moves away from the tower and pumps.

Tower 26 and access truss 28 support fixed sections 52 of the pipeline system 32 and flexible conduit end sections 54. The flexible conduits 54 are connected to the outlets of the pumps 30 which are supported by the tower. The flexible conduits permit the pumps to be raised and lowered as desired. Conventional lifting devices, such as a block and tackle or drum and cable hoist (not shown), are located near the top of the tower 26 to support, raise, and lower the pumps 30 for vertical adjustment relative to the elevation of the lagoon sludge 24, to achieve efficient pumping, as well as for pump inspection, maintenance, replacement, etc. A plurality of pumps 30 may be utilized, both to increase production and to provide spares in case of pump failure. A sump 56 dug in the lagoon bottom in the pumping zone serves as an accumulator of sludge 24 for pumping as the level of the lagoon sludge at the tower approaches the lagoon bottom.

Turning to FIGS. 7, 8, 9 and 10, a preferred floatable skimmer 34 is shown. The skimmer 34 comprises a pair of pontoon skids 66, a pusher blade 68 positioned between the pontoons 66, and a framework 70 which pivotally supports the blade 68 on the pontoons and holds the pontoons 66 in predetermined spaced relationship to one another. The skimmer components may be steel weldments, or may be fabricated from other suitable durable materials. Yokes 72 and 74 are attached to the pontoons as indicated in FIG. 8 and may be fabricated from cable or other elongated members.

In the illustrated unit, the pontoons 66 are elongated water-tight containers having taper ends 76 on their bottoms to reduce drag during movement. The pontoons provide floatation to support the skimmer on the surface of the sludge until depth of sludge in the lagoon is less than the draft of the pontoons. Thereafter, the pontoons serve as skids, gliding on the lagoon bottom 39.

Framework 70 is a simple structural truss. Blade 68 is an imperforate planar member, with suitable reinforcing as at 68a. Support arms 78 are affixed to the blade 68 and are pivotally mounted on the frame 70, as at pivot pins 80, to provide a supporting pivotal mounting for the pusher blade 68 (see FIGS. 9 and 10). This pivotal mounting allows the blade 68 to pivot upward and away from the sludge, as shown in FIG. 10, to reduce drag during out-haul travel of the skimmer 34. Counterweights 82 on inclined upper portions 84 of the arms 78 assist the blade 68 in pivoting upward, as shown in FIG. 10, under the force of passing sludge during out-haul travel. During in-haul, the blade 68 pivots downward against braces 86, see FIG. 9. Additional pivotal mounts are provided, as at 87, to permit vertical adjustment of the blade 68 so that its lower edge is even with or slightly above the lower surface 66a of pontoons 66 to achieve finish scraping of a lagoon bottom 39 for final cleaning of a lagoon as it is emptied.

Referring now to FIGS. 1 and 6, a cable drive system 36 for operating a skimmer 34 comprises a double-drum reversible hoist 88 having an in-haul drum 90 and an out-haul drum 92, a fixed post 94 on the berm, appropriate head sheaves 96 attached to the tower 26, tail sheaves 98 on the tail tower or anchor unit 38, and an idler sheave 100 which also is anchored on the berm near the hoist 88. In-haul sheave blocks 104 and out-haul sheave blocks 106 are attached to the post 94 on the lagoon perimeter. The in-haul cable 108 is attached to yoke 74 on the in-haul side of the skimmer 34, and out-haul cable 110 is attached to yoke 72 on the out-haul side of the skimmer assuring proper alignment of the skimmer 34. The tail unit 38 preferably is movable, as by being mounted on a track-type tractor 102 for ready relocation of the tail unit to any point on the perimeter of the lagoon.

In operation, rotation of the hoist drum 90 pulls in-haul cable 108 through in-haul sheave blocks 104 and 96 which moves the skimmer 34 towards the tower 26, as drum 92 pays out the out-haul cable 110. After the skimmer 34 has reached the tower pushing a mass of sludge 24 to the pumps 30, the hoist 88 is reversed and out-haul travel or withdrawal of the skimmer is achieved by the out-haul drum 92 of hoist 88 pulling out-haul cable 110 through out-haul sheave blocks 106, idler sheave 100, and tail sheaves 98, as drum 90 pays out cable 108, whereby skimmer 34 moves towards the respective tail unit 38. In this manner the skimmer 34 is pulled back and forth through the sludge 24, across the lagoon 20, bringing sludge material 24 to the pumps 30. The hoist 88 may be operated at different speeds, e.g., at a slower speed during in-haul or excavating motion and at a higher speed during out-haul or return for increased operational efficiency.

The blade 68 pivots to its downwardly extended position during in-haul movement (FIG. 9), and thereby pushes or causes general flow of a mass of the sludge toward the pumps. During out-haul the blade pivots up, as in FIG. 10, to avoid outward movement of the sludge. The operation is substantially the same whether the skimmer 34 is floating on the sludge 24 or gliding on the lagoon bottom 37 during final cleaning.

Moving the material to the pumps allows the entire lagoon to be pumped and emptied from a single location. In addition, this novel material handling system has a high degree of flexibility in that the system adapts readily to lagoons of varying configuration and depth. One skimmer can be moved readily to excavate an entire lagoon. However, a multiplicity of skimmers may be utilized to keep the sludge pump sufficiently supplied with material.

It is not necessary to dilute the gelatinous sludge to obtain flowage since the skimmer imparts the necessary motion to the thickened sludge. Transportation costs are thereby minimized.

A collateral benefit is derived from the inherent mixing achieved by passing the skimmer to and fro through the thickened sludge. During in-haul, the sludge builds up in front of the moving skimmer and forms a shallow mound of constantly changing and stirred material, and during out-haul passage of the skimmer causes additional stirring, thereby enhancing the flowability of the sludge due to its thixatropic properties and rendering it more readily pumpable. This mixing also tends to make the material more homogenous and consequently more susceptible to pumping.

The configuration of the skimmer, especially the adjustable blade height and tapered pontoons, permits the skimmer to either float on the sludge or glide on the lagoon bottom for finish scraping. The fact that the blade is vertically adjustable relative to the pontoons allows the blade to be extended well into the sludge for efficient movement of the material when the skimmer is floating and to be raised for bottom scraping. By raising the blade further, as to pivot holes 112, the skimmer may be used to spread a uniform layer of material over the bottom of the lagoon, if desired.

It will be appreciated that the skimmer 34 also may be utilized to transport other materials or mechanisms about a storage basin, e.g., as in transporting equipment to an inaccessible work site or for mixing or agitating the sludge, spreading other materials over the sludge, or injecting materials into the sludge.

Finally, the apparatus of this new system of material handling is readily movable from one lagoon to another. The tower needs no foundation, utilizing only a combination of anchored tension guy wires and anchored access truss for support.

It will be seen that the aforestated objects are met by the described invention, along with other efficiencies and advantages.

While a particular embodiment of this invention is shown above, it will be understood, of course, that the invention is not limited thereto, since many modifications may be made by those skilled in the art, particularly in light of the teachings herein. It is contemplated, therefore, by the appended claims, to cover any such modifications as fall within the true spirit and scope of the invention.

What is claimed is:

1. In combination with a storage lagoon containing a body of heavy viscous sludge such as sewage sludge extending to a substantial depth from an upper surface, apparatus for reclaiming such sludge from such storage lagoon comprising means for removing such sludge from one portion of such lagoon, a pusher unit having float means for floatably supporting said unit in the surface zone of such sludge in said lagoon, cable drive means connected to said unit for propelling said floatably supported unit back and forth across said lagoon toward and away from said one portion, said cable drive means being adjustable for so propelling said unit along various paths extending from said one portion across the various other portions of said lagoon from which such sludge is to be removed, said unit including pusher means mounted on said unit for extending into such sludge in which said unit is floating for pushing a mass of such sludge along the surface zone of the stored sludge in said lagoon from such other portions of said lagoon toward said one portion when said unit is moved across such lagoon toward said one portion to keep said removal means supplied with such sludge, and said pusher means being movable to an inactive position for reducing movement of such sludge by said unit during movement of said unit away from said one portion.

2. Apparatus as in claim 1 wherein said pusher means comprises a pusher blade pivotally mounted on said unit to engage and push such material when moved toward said means for removing such materials and to be retracted when moved in an opposite direction.

3. Apparatus as in claim 1 wherein said pusher unit includes a plurality of pontoons, a frame supported on said pontoons, and a pusher means retractably supported on said frame.

4. Apparatus as in claim 3 wherein said pusher means is pivotally mounted on said frame to engage and push such material when moved toward said means for removing such materials and to be retracted when moved in an opposite direction.

5. Apparatus as in claim 1, wherein said means for removing such material comprises a lifting device for removal of sludge.

6. Apparatus as in claim 1 wherein said means for removing such materials comprises a pump.

7. Apparatus as in claim 6 including a tower positioned in said lagoon and supporting said pump.

8. Apparatus as in claim 7 including a sufficient length of flexible conduit connected to the outlet of said pump whereby said pump may be adjusted to various elevations.

9. Apparatus as in claim 1 wherein said pusher means comprises a movable blade member having a material-engaging surface extending generally normal to the direction of travel of said unit during such movement toward said one portion.

10. Apparatus as in claim 7 wherein said cable drive includes a head sheave block attached to said tower.

11. Apparatus as in claim 10 including means for anchoring said tower comprising a rigid member having one end attached to said tower and another end fixed relative to said lagoon, and stabilizing means joined at one end to said tower and having the opposite end anchored relative to said lagoon in spaced relation to said fixed end of said rigid member.

12. In combination with a storage lagoon containing a body of heavy viscous sludge such as sewage sludge extending to a substantial depth from an upper surface, apparatus for removing such sludge from said lagoon including pump means for pumping said sludge from one portion of said lagoon, a pusher unit having float means for floatably supporting said unit in the surface zone of said sludge in said lagoon, cable drive means connected to said unit for propelling said floatably supported unit back and forth across said lagoon toward and away from said one portion, said cable drive means being adjustable for so propelling said unit along various paths extending from said one portion across various other portions of said lagoon from which such sludge is to be removed, and said unit including blade means supported on said float means, means mounting said blade means for movement relative to said float means, said blade means extending into such sludge in which said unit is floated and presenting a sludge-engaging surface extending transverse to the direction of movement of said unit during movement of said unit toward said one portion for pushing a mass of such sludge along the surface zone of the stored sludge from such other portions of said lagoon toward said one portion during such movement of said unit for subsequent removal by said pump means, and said blade means being automatically movable to a retracted position for reducing movement of said sludge by said unit during movement of said unit away from said one portion.

13. Apparatus as in claim 12, wherein said cable drive means comprises cable and power drum means for drawing said pusher unit toward and away from said pump means.

14. In combination with a storage lagoon containing a body of heavy viscous sludge such as sewage sludge extending to a substantial depth from an upper surface, apparatus for reclaiming such sludge from such storage lagoon comprising pump means disposed for pumping such sludge from such lagoon, a tower positioned in such lagoon, said pump means being supported on said tower, an access truss connected between said tower and one side of such lagoon to stabilize the tower, tension guy wires anchored at the side of such lagoon and connected to said tower for stabilizing said tower and access truss, a pusher unit having float means for floatably supporting said unit in the surface zone of such sludge in said lagoon, cable drive means connected to said unit for propelling said floatably supported unit back and forth across said lagoon toward and away from said tower, said cable drive means being movable for so propelling said unit along various radii extending from said tower across various portions of said lagoon from which such sludge is to be removed, said unit including pusher means mounted on said unit for extending into such sludge in which said unit is floating for pushing a mass of such sludge along the surface zone of the stored sludge in said lagoon from such portions of said lagoon toward said tower when said unit is moved across such lagoon toward said tower to keep said pump means supplied with such sludge, and said pusher means being movable to an inactive position for reducing movement of such sludge by said unit during movement of said unit away from said tower.

15. Apparatus as in claim 11 wherein said stabilizing means comprises a pair of flexible stays.

16. Apparatus as in claim 15 wherein said cable drive means includes a tail unit comprising an anchor vehicle movable along the perimeter of said lagoon.

17. Apparatus as in claim 14 wherein said cable drive means includes a tail unit comprising an anchor vehicle movable along the perimeter of said lagoon.

18. A floatable device for use in enhancing movement of quantities of heavy viscous materials along the surface zone of bodies of such materials, as in storage lagoons containing such materials, comprising pontoon means for floatably supporting said device in the surface zone of such materials, a support frame mounted on said pontoon means, pusher blade means pivotally supported on said support frame, said blade means being pivotally movable to a first position wherein said blade means is positioned generally normal to the path of movement of said device as said device is moved in one direction and is vertically positioned relative to said pontoon means such as to be disposed in such material in which said device is floating, and brace means on said support frame for maintaining said blade means in said first position as said device is moved in said one direction to thereby engage and move a mass of the material by said blade means as such device is moved in said one direction, and said blade means being pivotally movable to a second position wherein said blade means is retracted from said first position to permit relatively free movement of said device through such material and thereby to substantially avoid movement of such material with said device as said device is moved in an opposite direction.

19. A floatable device as in claim 18 wherein said pontoon means comprises a pair of spaced pontoons.

20. A floatable device as in claim 18 wherein said blade means is vertically adjustable relative to said pontoon means.

21. A floatable device as in claim 18 wherein said blade means comprises a blade pivotally supported on said frame for free pivotal movement about a horizontal axis whereby said blade pivots downward into such material and against said brace means during movement of said device in said one direction and pivots upward at least partially out of such material during movement of said device in an opposite direction.

22. A device as in claim 21 including a counterweight connected to said blade to assist in retraction of said blade during movement of said device in said opposite direction.

23. A floatable device for use in enhancing movement of quantities of heavy viscous sludge materials along the surface zone of bodies of such sludge materials, as in storage lagoons containing such materials, comprising a pair of spaced pontoons, a frame supported on said pontoons, a pusher blade positioned generally parallel to a line joining said spaced pontoons, means mounting said blade on said frame for movement into an extended sludge engaging position in which said blade extends generally vertically between said pontoons and is vertically positioned, relative to said pontoons, such that said blade extends extends into such materials in which said device is floated by said pontoons during movement of said device in one direction generally normal to said blade and for retraction of said blade from said extended position during movement of said device in an opposite direction, and means for adjusting the effective height of said blade relative to said pontoons in such extended position.

24. A method for reclaiming heavy viscous material such as sewage sludge from a large storage basin containing a body of such material extending to a substantial depth from an upper surface, comprising removing said material from said basin at a predetermined location within said basin; floating a pusher unit in said material in said basin; moving said floating pusher unit back and forth across other portions of said basin from which such material is to be removed, toward and away from said predetermined location; pushing successive masses of said material along the upper surface zone of the stored material toward said location with said floating pusher unit by successive movements of said floating pusher unit toward said predetermined location; and reducing the engagement of said pusher unit with said material during intervening movements of said pusher unit away from said predetermined location.

25. A method for reclaiming heavy viscous sewage sludge from a large storage lagoon containing a substantially homogeneous body of such sludge comprising pumping said sludge from said lagoon at a predetermined location within said lagoon; floating a pusher unit in said sludge in said lagoon; moving said floating pusher unit back and forth across various portions of said lagoon from which such material is to be removed, toward and away from said predetermined location; pushing successive masses of said sludge along the upper surface zone of the stored sludge toward said location with said floating pusher unit by successive movements of said floating pusher unit toward said predetermined location; and reducing the engagement of said pusher unit with said material during intervening movements of said pusher unit away from said predetermined location.

References Cited
UNITED STATES PATENTS

| | | | |
|---|---|---|---|
| 2,137,421 | 11/1938 | Tark | 210—525 |
| 1,498,162 | 6/1924 | Gillespie | 172—26.5 |
| 2,497,177 | 2/1950 | McClintock et al. | 210—242 X |
| 1,514,336 | 11/1924 | Pruss | 210—523 |
| 1,537,580 | 5/1925 | Burkett | 37—117 |
| 2,670,080 | 2/1954 | Scott | 210—527 |
| 1,864,778 | 6/1932 | Tark | 210—524 X |
| 1,773,479 | 8/1930 | Escher | 210—523 |
| 953,624 | 3/1910 | Kendle | 37—71 |
| 3,679,004 | 7/1972 | Loy | 37—71 |
| 2,734,634 | 2/1956 | Knowles | 210—525 |

FRANK A. SPEAR, JR., Primary Examiner

T. A. GRANGER, Assistant Examiner

U.S. Cl. X.R.

37—117; 210—170, 242, 523

UNITED STATES PATENT OFFICE
CERTIFICATE OF CORRECTION

Patent No. 3,796,658            Dated March 12, 1974

Inventor(s)    JOHN F. MEISSNER

It is certified that error appears in the above-identified patent and that said Letters Patent are hereby corrected as shown below:

Column 2, line 36, "scaping" should read -- scraping --. Column 8, line 46 (Claim 23), delete "extends" (second occurrence).

Signed and sealed this 16th day of July 1974.

(SEAL)
Attest:

McCOY M. GIBSON, JR.            C. MARSHALL DANN
Attesting Officer               Commissioner of Patents